(12) United States Patent
Mizell et al.

(10) Patent No.: US 7,380,124 B1
(45) Date of Patent: May 27, 2008

(54) SECURITY TRANSMISSION PROTOCOL FOR A MOBILITY IP NETWORK

(75) Inventors: Jerry Mizell, Plano, TX (US); David Lauson, McKinney, TX (US); Peter Wenzel, Plano, TX (US); Steven Currin, McKinney, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 610 days.

(21) Appl. No.: 10/109,422

(22) Filed: Mar. 28, 2002

(51) Int. Cl.
*H04L 9/00* (2006.01)
*H04K 1/00* (2006.01)
*G06F 9/00* (2006.01)
*G06F 15/16* (2006.01)
*G06F 17/00* (2006.01)
*G06F 15/177* (2006.01)
*G06F 15/173* (2006.01)

(52) U.S. Cl. ............ 713/171; 713/150; 713/153; 713/168; 713/169; 380/270; 380/271; 380/272; 380/273; 380/274; 380/247; 380/287; 380/255; 726/14; 726/15; 709/200; 709/218; 709/223; 709/230; 709/232

(58) Field of Classification Search ........... 713/171, 713/100, 150, 153, 168, 169; 380/270–274, 380/247, 287, 255; 726/14, 15; 709/200, 709/218, 223, 230, 232
See application file for complete search history.

(56) References Cited

U.S. PATENT DOCUMENTS 6,167,513 A * 12/2000 Inoue et al. ............. 713/150
6,466,964 B1 * 10/2002 Leung et al. ............. 709/202
6,507,908 B1 * 1/2003 Caronni ................... 713/153
6,839,338 B1 * 1/2005 Amara et al. ............ 370/338
2001/0009025 A1   7/2001 Ahomen

OTHER PUBLICATIONS

Tsuda, T.; Ishiyama, M.; Fukumoto, A.; Inoue, A.; Design and implementation of Network CryptoGate-IP-layer security and mobility support; Jan. 1998, Proceedings of the Thirty-First Hawaii International Conference on vol. 7.*

Zao, John; Stephen Kent; Joshua Gahm, Gregory Troxey; Matthew Condell; Pam Helinek; Nina Yuan; and Isidro Castineyra, "A Public-Key Based Secure Mobile IP," Mobicom 97 (1997).

Inoue, Atushi; Masahiro Isiyamama; Atsushi Fukumato; and Yashiyuki Tsuda, "IP Layer Security and Mobility Support Design Policy and an Implementation," Tashiba Corp.—XVI World Telecom Congress Proceeding (Sep. 21, 1997).

Perkins, C.; "RFC 3220 IP, Mobility Support for IPv4"; The Internet Society; Jan. 2002.

3rd Generation Partnership Project; Technical Specification Group Services and System Aspects; General Packet Radio Service (GPRS); Stage 2 Release 1999.

(Continued)

*Primary Examiner*—Ayaz Sheikh
*Assistant Examiner*—Shin-Hon Chen
(74) *Attorney, Agent, or Firm*—Hemingway & Hansen, LLP; D. Scott Hemingway (57) ABSTRACT

The present invention supports a secure transmissions protocol for information packet transmission between a Mobile Node and a Foreign Agent. The information packets are encrypted and decrypted using an integrated software client that combines mobile IP communication support and encrypting and decrypting protocols.

22 Claims, 5 Drawing Sheets

OTHER PUBLICATIONS

Soininen, Jonne, "GPRS/UMTS" Nokia Feb. 29, 2000.
"TR 45 Wireless IP Network Standard," Jun. 2000.
T2vetov, Vesselin; Erika Sanchez; "Mobile Virtual Private Network"; Mobile IP Working Group; Sep. 15, 2000.
"Introduction to IP Sec VPN's", Cisco Systems, Inc., 1998.
Gleeson, B.; A. Lin; J. Heinanen; G. Armitage; A. Malis; "RFC 2764 A Framework for IP Based Virtual Private Networks"; The Internet Society; Feb. 2000.
"Virtual Private Networking in Windows 2000: An Overview", Microsoft Corporation, 1999.
Harkins, D. and D. Carrel, "RFC 2409 The Internet Key Exchange (IKE)", The Internet Society, Nov. 1998.
Maughan, D.; M. Schertler; M. Schneider; J. Turner; "RFC 2408 Internet Security Association and Key Management Protocol;" The Internet Society; Nov. 1998.
Kent, S. and R. Atkinson, "RFC 2406 IP Encapsulating Security Payland (ISP)", The Internet Society, Nov. 1998.
Kent, S. and R. Atkinson, "RFC 2401 Security Architecture for the Internet Protocol", The Internet Society, Nov. 1998.
Danziesen, Marc, "Secure Mobile IP Communication", Instital für Informatik and angewandte Mathematik, 2001.
Johnson, David and Charles Perkins, "Mobility Support in JPv6", IETF Mobile IP Working Group, Jul. 2, 2000.

* cited by examiner

SECURITY TRANSMISSION PROTOCOL FOR A MOBILITY IP NETWORK

TECHNICAL FIELD OF THE INVENTION

A security transmission protocol for information packet transmissions on a mobility IP network.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

Computer networks communicate with each other according to the protocol hierarchy of the Open System Interconnection (OSI) reference. Each protocol possesses its own set of rules and procedures independent of other protocols. Each piece of software or hardware implementing a protocol is referred to as a protocol entity. A protocol entity is classified by various positions on a layered protocol stack.

Protocol entities operate by interpreting the header on the data they receive from a higher layer, processing the packet as specified by the header and the associated protocol, and transmitting information packets. The information packet header will identify the applicable protocol and operation to which it pertains. For example, a TCP header identifies the packet as containing information for a TCP protocol, while an IP header identifies the information as containing information for an IP protocol.

The operations and hierarchy of operations performed by an entity can be graphically represented by a layered protocol stack. As the entities perform operations based on the header, the packet payload data is processed and examined for the next logical operation on the information packet.

The protocol standards are configured on a layered communication system structure. All the layers are located on each computer in the network, and each layer is a separate component that theoretically functions independent of the other layers. IP and related protocols form a standardized system for defining how packets should be processed, transmitted and received on the Internet. TCP/IP defines the network communication process and specifies the information packet format so the transmitted data is interpreted correctly. Because of the standardized layer design of the protocols, a consistent conversion of base payload data occurs regardless of the version or vendor of the communication software.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

TCP/IP Addressing and Routing

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the subnetwork. A header data field in the information packet will include source and destination addresses. The IP addressing scheme imposes a consistent addressing scheme that reflects the internal organization of the network or sub-network.

A router is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

TCP/IP network protocols define how routers determine the trans-mission path through a network and across network boundaries. Routing decisions are based upon information in the IP header and corresponding entries in a routing table maintained on the router. A routing table contains the information for a router to determine whether to accept an information packet on behalf of a device or pass the information packet on to another router.

Routing tables can be configured manually with routing table entries or with a dynamic routing protocol. A manual routing table can be configured upon initialization. In a dynamic routing protocol, routers update routing information with periodic information packet transmissions to other routers on the network. The dynamic routing protocol accommodates changing network topologies, network architecture, network structure, layout of routers, and interconnection between hosts and routers.

The IP-Based Mobility System

The Internet protocols were originally developed with an assumption that Internet users would be connected to a single, fixed network. With the advent of cellular wireless communication systems, such as mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node. Typically, a mobile node maintains connectivity to its home network through a foreign network. The mobile node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

While coupled to a foreign network, the mobile node will be assigned a care-of address. This is a temporary IP address assigned by the foreign network. The care-of address is used by routers on the foreign network to route information packets addressed to the mobile node. While residing on a foreign network, a mobile node may move from one location to another, changing its connectivity to the network. This movement changes the physical location of the mobile node and requires updating routing tables and/or care-of addressing to keep up with this movement.

When a mobile node is operating on a foreign network, specialized servers are used to authenticate, authorize, and collect accounting information for services rendered to the mobile node. This authentication, authorization, and accounting activity is called "AAA," and AAA computer servers on the home and foreign network perform the AAA activities.

Authentication is the process of proving one's claimed identity, and security systems on a mobile IP network will often require authentication of the system user's identity before authorizing a requested activity. The AAA server authenticates the identity of an authorized user and authorizes the mobile node's requested activity. Additionally, the AAA server performs the accounting functions by tracking usage on the network.

Virtual Private Networks

A Virtual Private Network (VPN) emulates a private network over a shared physical infrastructure. By way of example, a VPN can reside within a local area network (LAN) system or on several different networks. A VPN can also span multiple computer systems.

A VPN can be used to extend the communication capabilities of a corporate network to remote offices or users, all of which will support or use Internet, extranet, or dial-up services. In this way, connectivity to the VPN network is provided in the same manner as a dedicated private network, but there is no need to provide all the equipment and support infrastructure at a remote location.

A service provider, or other network structure, provides the remote physical system and computer infrastructure within which the "virtual" VPN network resides. In this manner, the VPN can function much the same as a single, physical network even though there are intervening host infrastructures and communications traverse network boundaries. A number of different types of VPNs are suggested in RFC 2764, but this is by no means an exhaustive list of possible VPN constructs. The distinguishing hallmark of a VPN is a single, logical network found on a public or private computer infrastructure with the VPN residing upon one or more autonomous systems.

Tunneling

Tunneling is the basic methodology in IP communication by which an information packet is routed to the appropriate Internet node through an intermediate Internet address. To emulate the point-to-point connections of a private network, VPN methodology uses secure tunnels to handle information packet transmission across the public infrastructure.

Typically, an information packet with network routing can be encapsulated with IP address information. Encapsulation involves adding an outer IP header to the original IP header fields. In this manner, a "tunnel" can be constructed. The outer IP header contains a source and destination IP address—the "endpoints" of the tunnel. The inner IP header source and destination addresses identify the original sender and destination addresses.

The original sender and recipient addresses for the information packet remain unchanged after encapsulation, while the new "tunnel" endpoint addresses are appended onto the original information packet. This appended address information alters the original IP routing by delivering the information packet to an intermediate destination node (in mobile IP typically a foreign router), where the encapsulated information packet is "decapsulated" or "de-tunneled" yielding the original information packet. The packet is then delivered to the destination address found in the original IP address based on the associated routing table entries on network routers.

The "tunnel" is established by encapsulating an information packet containing the original IP address of the mobile node (and payload data) and an IP source address with the intermediate routing IP address (i.e. care-of address) of the foreign network. In the more specialized application of VPNs, the tunnels can be secured by encryption and authentication protocols. These security protocols ensure integrity and confidentiality of information packet data transmission during a communication session. These security protocols, however, operate predominantly on and between the home network and the foreign network.

By encapsulating the data with an IP header, an encrypted information packet can be routed securely over the public communication infrastructure between the foreign network and the home network. During transit through the tunnel over the public communication infrastructure, the information packet data payload being transmitted is encrypted, and the encrypted data can only be deciphered using the private encryption keys that permit the encryption algorithm to decode the data as well as encrypt the data. The foreign network will decrypt the information packet and send the decrypted packet to the mobile node. Obviously, the wireless transmission of a decrypted information packet to the mobile node is subject to interception and unauthorized use.

In prior implementations of a VPN, two software applications are usually required. These applications include a mobile IP client and a VPN client. Because no single integrated client can implement the two software applications, two clients are required to work in tandem to setup and maintain a VPN tunnel and communication connection to the mobile node.

Present VPN solutions in a wireless environment are not satisfactory. There are a number of unresolved challenges to encrypting an information packet for transmission to mobile nodes that move across network boundaries, especially in the VPN environment. Full encryption of information packets from the mobile node across the wireless link to the home network has proven very difficult to implement. Whenever the mobile node changes its connectivity to a network, the routing address changes requiring resetting the clients and performing new authentication and session encryption keys exchange. Changing routing addresses requires both time and system resources for transmitting administrative information. These increased overhead requirements result in latency in session information transmission, loss of data, and sometimes session termination. There is a present need to improve securing the wireless link from the mobile node to the foreign network and ensure secure communication over the wireless link.

SUMMARY OF THE INVENTION

The present invention supports a secure transmission link between a mobile node and a foreign agent using an integrated software application. The support software is operated on the foreign agent and the mobile node to support secure communications between the mobile node and the foreign agent. As such, the present invention provides a secure transmission protocol for communications to and from mobile nodes.

The support software used in the present invention includes features and protocols for initializing and maintaining a mobile IP connection. The software will also perform initialization functions, set up IP connections and care-of addressing between the foreign agent and the home network, and format the data being transmitted into IP/TCP information packets with routing information for transmission over the Internet.

The support software will also perform the VPN functions in an integrated environment, essentially combining previously separate software modules or clients into a single client environment. The functions performed by this integrated client include user authentication, address management, data encryption, and key management. Private session keys are set and used in the IP/VPN client's encryption algorithms. Data encryption includes both the data payload of the information packet and the actual IP identifier of the mobile node and the home network.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
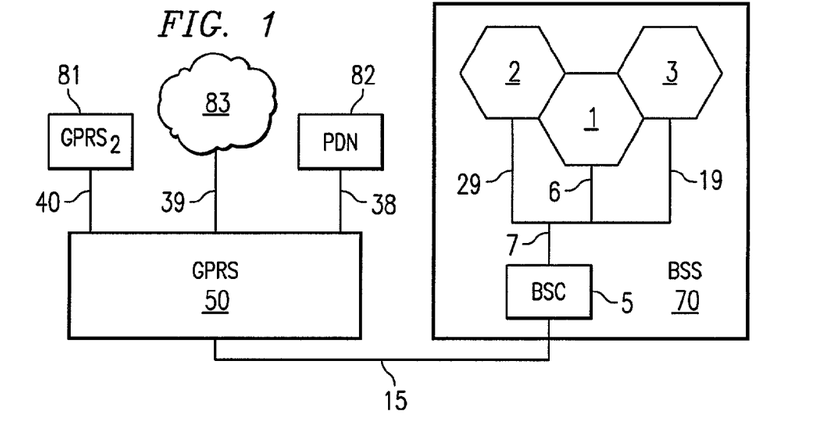
FIG. 1 is a schematic diagram of a mobile IP wireless communications network featuring a General Packet Radio Service (GPRS)

Referring to FIG. 1, cell site 1 supports wireless communication with mobile nodes (e.g. cellular phones, laptop computers, palm pilot devices, etc.) within that cell site service area. Other cell sites 2 and 3 are located next to cell site 1 on FIG. 1, and each cell site 2 and 3 supports wireless communications in their respective areas.

The Base Station Controller ("BSC") 5 is coupled to the cellular site 1 by signal lines 6 and 7. The BSC 5 is coupled to cellular site 3 via signal line 19 and 7, and the BSC 5 is coupled to cellular site 2 via signal line 29 and 7. The BSC 5 supports the transmission of voice and data communications on the cellular wireless network, and the BSC 5 allows for the continuity of transmissions to and from mobile nodes as the mobile nodes roam the wireless network from one cellular site to another (e.g. cell site 1 to cell site 2). The BSC 5 will also control other components in the cellular sites to further support the transmission of voice and data on the wireless network. Collectively, the BSC 5 and its associated components can be called a Base Station Subsystem ("BSS") 70. The BSC 5 can also be individually referred to as a BSS. The BSS is also sometimes referred to as the Radio Access Network (RAN).

A General Packet Radio Service ("GPRS") network 50 is shown in FIG. 1. The BSC 5 unit is coupled to GPRS 50 through interface signal line 15. The GPRS 50 supports the transmission of IP packets, and other types of packeted data, over a communication infrastructure. The GPRS 50 provides packet-based access to a mobile node on the BSS 70 through the Gb interface signal line 15.

The GPRS 50 is also coupled to other types of networks, such as GPRS$_2$ 81, a Packet Data Network (PDN) 82, and the Internet 83. The GPRS 50 is coupled to the GPRS$_2$ 81 via communication link 40. The GPRS 50 is coupled to the PDN 82 via communication link 38, and the GPRS 50 is coupled to the Internet 83 via communication link 39.

The BSC 5 supports wireless communications from a subscriber, mobile unit user, or a mobile node in the cell site 1, cell site 2, and cell site 3 service areas. As a mobile node moves across these cell site boundaries, it will be able to communicate on the Internet 83, to PDN 82, or $GPRS_2$ 81 through the Gb interface 15 and the GPRS 50. If the mobile node crosses a boundary from a cell site connected to BSC 5 to a different BSC, communication support will be switched from the BSC 5 to the new BSC.

Figure 2:
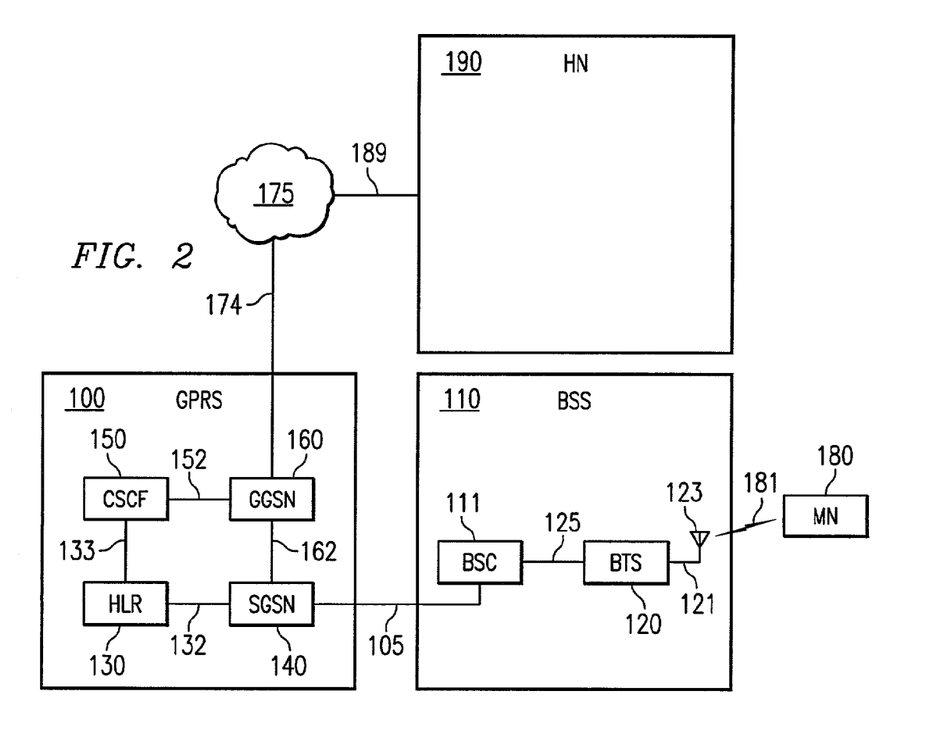
FIG. 2 is a schematic diagram of a GPRS communication network.

FIG. 2 shows greater internal details of a General Packet Radio Service (GPRS) wireless telecommunication network 100 coupled to a BSS 110 via Gb interface signal line 105. The Gb interface signal line 105 is coupled to the BSS 110 through its associated BSC 111. The BSC 111 is in turn coupled to a Base Transceiver Subsystem (BTS) 120 supporting wireless communications on a cellular site. The BSC 111 is coupled to the BTS 120 via communication line 125. The BTS 120 is coupled to an antenna 123 via communication line 121. The antenna 123 supports wireless communications with the Mobile Node (MN) 180 via wireless communication link 181.

The GPRS network 100 comprises a Home Location Register (HLR) 130 coupled to a Serving GPRS Support Node (SGSN) 140 via signal line 132. The GPRS 100 also comprises a Call Server Control Function Node (CSCF) 150 coupled to a Gateway GPRS Support Node (GGSN) 160 via signal line 152. The GGSN 160 is coupled to the SGSN 140 via signal line 162, and the CSCF 150 is coupled to the HLR 130 via signal line 133. The interface connection 132 between the SGSN 140 and the HLR 130 is referred to as the Gr interface. The interface connection 162 between the SGSN 140 and the GGSN 160 is referred to as the Gn interface.

The interface connection 105 between the SGSN 140 and the BSC 111 of BSS 110 is the Gb interface. The data transmission between the SGSN 140 and BSC 111 flows through the Gb interface 105 thereby permitting communication between the BSS 110 and the GPRS 100. GPRS 100 is also coupled to other networks, such as a PDN (not shown), the Internet 175, or other GPRSs (not shown), as described in FIG. 1. A connection from the GPRS 100 to the Internet 175 via communication link 174 is shown. The Internet 175 is connected to the home network 190 of the MN 180 by communication link 189.

In a mobile IP communication system, the MN 180 is identified by an IP address. Typically, this is a permanent IP address assignment, but the IP address may be assigned by a home network Dynamic Host Configuration Protocol (DHCP) server from a pool of available IP addresses. While the MN 180 is coupled to its home network 190, the MN 180 functions as any other fixed node on that network. However, when the MN 180 is located away from its home network 190 and attached to a foreign network (e.g. GPRS 100), the home network 190 transmits data communications to the MN 180 by tunneling information packets to the foreign network 100. In turn, the MN 180 communicates with its home network 190 by tunneling information packets through the foreign network 100 to the home network 190.

Figure 3:
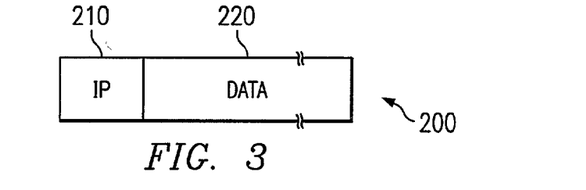
FIG. 3 is a representation of an information packet.

The general format of an information packet used on packet-based communication systems is shown in FIG. 3. Information packets use an encoding format of "1" and "0" data bits to build a data stream that a computer can interpret. The information packet 200 has an IP address header 210 that provides routing instructions for transport over an IP communication system. The actual length and configuration of the IP header 210 is dependent on the actual communication protocol being used (e.g. IPv4 or IPv6). The information packet 200 also contains a variable length data field 220 that contains the actual information being transmitted from the originating source to the destination source.

Figure 4:
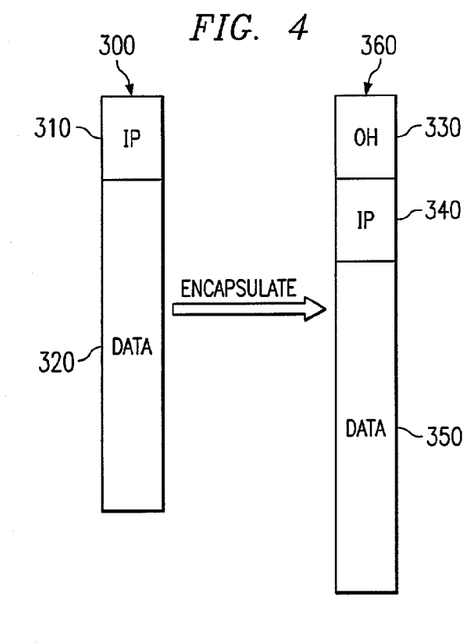
FIG. 4 a general representation of an original information packet and an encapsulated information packet used for tunneling.

The basic tunneling protocol used to route data is shown in FIG. 4. The original information packet 300 contains an IP Header (IP) 310 that comprises IP addresses for both the ultimate destination and the sender of the packet 300. The data (DATA) 320 is the actual data, or payload, being transmitted. After encapsulation, an Outer Header (OH) 330 is added to the information packet 300. This yields an encapsulated information packet 360 comprising an Outer Header 330 (typically an IP address) with the address for the tunnel entry and exit points, the IP Header 340 comprising the IP address of the destination and the source IP address, and the payload data 350. For routing to the MN 180, the encapsulated information packet will be routed from the Home Network (HN) 190 to the Foreign Network 100 (e.g. GPRS 100). Inside the GPRS 100, the encapsulated information packet will be routed to an intermediate destination, the GGSN 160. The GGSN 160 "decapsulates" or "de-tunnels" the information packet 300 from the encapsulated information packet 360 and routes the restored information packet 300 to the MN 180 based on the IP Header 340 and the associated care-of address in its routing table.

Figure 5:
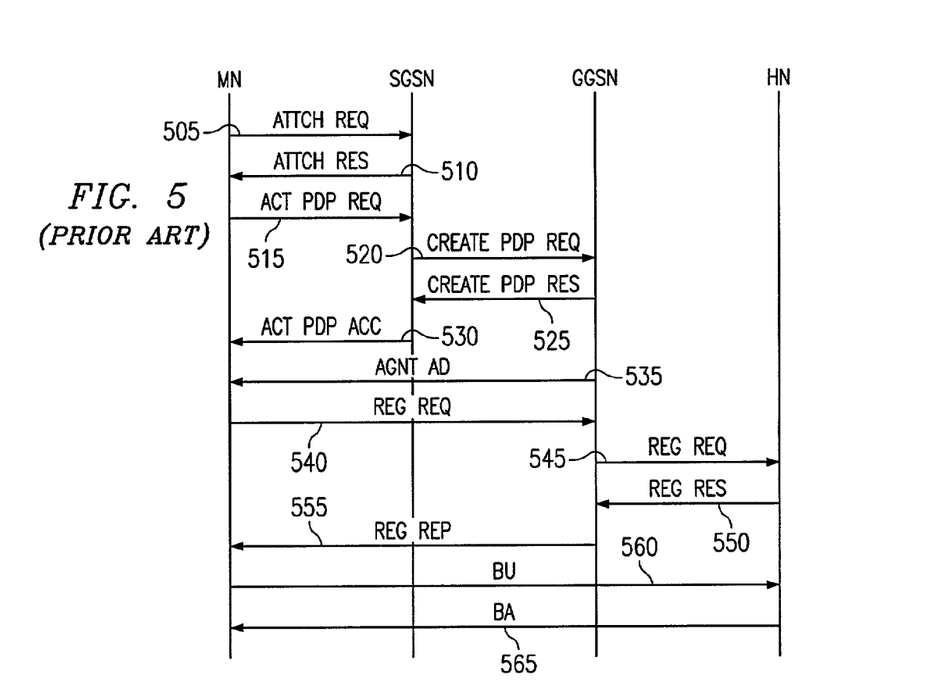
FIG. 5 is the prior art general message sequence for initiating a mobile IP communication session.

FIG. 5 shows the prior art message sequence for initializing a mobile IP session on the GPRS 100. First, the MN 180 must complete an attachment protocol to GPRS 100. At step 505, upon first connecting to a BSS 111 over wireless link 181, MN 180 will initialize a connection on the GPRS 100 with an Attachment Request (Attch Req) message sent to the SGSN 140. The SGSN 140 processes the request, checking that the user is authorized access and generating a temporary identity. The SGSN 140 sends an Attachment Response (Attch Res) message assigning a temporary identity to the MN 180 at step 510.

To exchange information packets outside the GPRS 100, the MN 180 must obtain a Packet Data Protocol (PDP) address, to use while on the GPRS. At step 515, the MN 180 sends an Activate PDP Context Request (Act PDP Req) to the SGSN 140. The SGSN 140 processes the request and generates a Create PDP Context Request (Create PDP Req) message to the GGSN 160 at step 520. At step 525, the GGSN 160 processes the request and obtains a PDP address for the MN 180 to use on the GPRS 100. A Create PDP Context Response (Create PDP Context Res) message is generated and sent to the SGSN 140. If authorized access, the SGSN 140 in turn generates and transmits an Activate PDP Context Accept (Act PDP Acc) message to the MN 180 at step 530.

After completing GPRS attachment and context activation, the MN 180 can now initiate the mobile IP protocol. At step 535, the MN 180 receives an Agent Advertisement (Agnt Ad) message from the GGSN 160. At step 540, the MN 180 sends a Registration Request (Reg Req) message to the GGSN 160, which processes the request and obtains an IP care-of address for use by the MN 180 on the GPRS 100. At step 545, the GGSN 160 generates and transmits a Registration Request (Reg Req) message to the MN 180's home network 190 containing the IP care-of address. At step 550, the home network 190 processes the message and, if the identity of the MN 180 is confirmed, a Registration Response (Reg Res) message will be sent back to the GGSN 160. The Reg Res message processing entity on the home network 190 can include a home agent or a computer server, such as an AAA server or a DHCP server. In step 555, the GGSN 160 processes the response, generates and transmits a Registration Reply (Reg Rep) message back to the MN 180 containing the IP care-of address. At step 560, the MN 180 confirms registration with the home network 190 by sending a Binding Update message (BU) to the home network 190. At step 565, the home network 190 responds to the BU message with a Binding Acknowledgement (BA) message. This completes the registration of the MN 180 under the mobile IP protocol and enables the MN 180 to send and receive IP information packets on the GPRS 100 network in a mobile IP session.

The problem with this communication initialization protocol is the lack of secure information packet transmissions over wireless link 181. During the exchange of message packets, the IP address in the information packets is not secure and is subject to interception. The communication session between the home network and the mobile node can be compromised without secure information packet transmission to the mobile node.

Under the invention, the mobile IP software program, or IP client, supports secure communications between the foreign agent and the mobile nodes. The supporting software of the invention provides for a secure communication protocol between the mobile node and the foreign agent, essentially forming as a single, integrated IP/VPN client.

Figure 6A:
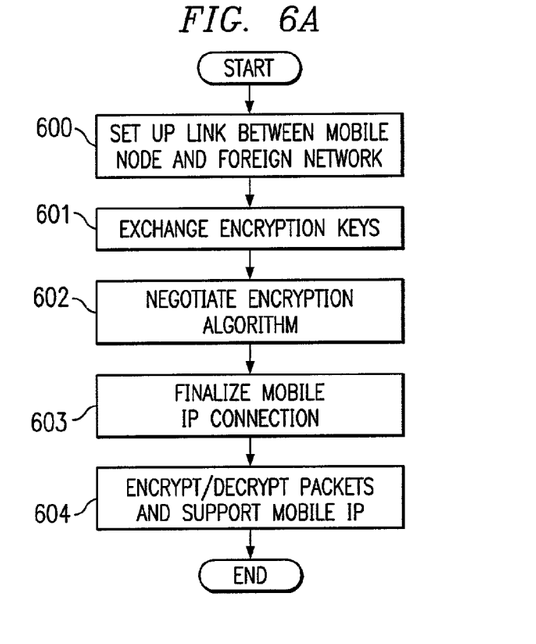
FIG. 6A is a flow diagram showing the procedures followed by the communication program to setup the secure VPN link and mobile IP session.

The basic sequence of operations performed by the IP/VPN client is shown in the flow diagram in FIG. 6A. The first operation 600 initializes the link between the MN 180 and the GGSN 160 (e.g. foreign agent) on the GPRS 100 (e.g. a foreign network). The second operation 601 exchanges encryption keys needed in the encryption algorithm subroutines. Acceptable algorithms for the key exchange include Message Digest 5 (MD5), Secure Hash Algorithm (SHA), and a Diffie-Hellman combination algorithm using a public and private encryption key. In the third operation 602, the encryption algorithm used during the communication session is negotiated. A number of encryption algorithms may be available in the subroutines of the program, including Data Encryption Standard (DES), Triple Data Encryption Standard (3DES), Rivest-Sharnir-Aldeman (RSA), ElGamal, RC2 and RC4.

At this point, the MN 180 and the GGSN 160 have the information needed to transmit information securely. The next operation 603 finalizes the mobile IP connection between the MN 180 and the home network 190. This step requires the selection of encryption/decryption protocols and algorithms to operate and secure the IP address and identity of the MN 180 and the home network 190. The final operation 604 transmits information packets using encryption and decryption.

Figure 6B:
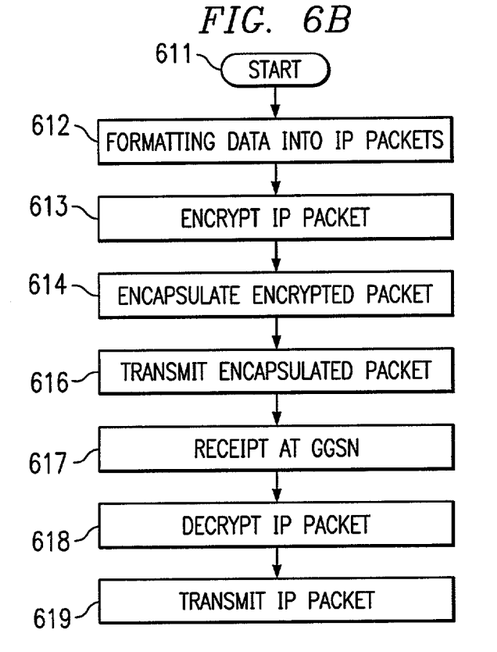
FIG. 6B is a flow diagram showing the sequence of operation for a transmission from the mobile node to the foreign agent.

FIG. 6B shows the operation of the IP/VPN client while transmitting an IP packet from the MN 180 to the home network 190. The program starts up at step 611, which includes connecting the MN 180 to the GPRS 100, exchanging session keys, negotiating the algorithms, and establishing a mobile IP connection from the MN 180 to the home network 190. At step 612, the protocol formats data into information packets. At this step, the client formats information packets for transmission on a packet based system, breaking down data into packets, formatting the packets, generating packet headers, and facilitating translation of data into the IP packet format. This step also includes generating an IP address header with the IP address of the destination and the source (e.g. the MN 180's IP identifier). The client continually performs this step for all packets sent during a communication session.

At step 613, the security protocol operating at MN 180 encrypts the IP information packet. IP packets formatted in step 612 are encrypted at step 613 using the exchanged session encryption key and the selected algorithm in the client's program subroutines. The client uses the keys and algorithms to encrypt the entire information packet, ensuring that the packet payload and IP address is secured during transmission over the wireless interface from the MN 180 to the BSS 120. During encryption, an IP security header (IPSec) is generated and appended to the encrypted packet.

Once the packet is encrypted, the client encapsulates the packet for transmission at step 614. The encrypted packet must be encapsulated with an outer header on the information packet for routing on the GPRS 100. This encapsulated header is an address used as the entry point into the secured tunnel that the encryption protocol creates between the MN 180 and the GGSN 160.

At step 616, the encapsulated packet is transmitted from the MN 180 to the BTS 120, which relays the packet to the BSC 111. The BSC 111 processes the packet and routes the packet to the SGSN 140. The SSGN 140 in turn routes the packet to the GGSN 160.

At step 617, the packet is received at the GGSN 160. Since the packet is addressed to the GGSN 160, the packet is processed, revealing an IP security (IPSec) header, which contains authentication data and specifies the requirement for the client to decrypt the packet. At step 618, the GGSN 160 decrypts the IP packet using the inverse of the encryption algorithms dictated by the integrated client software operating on the GGSN 160. At the final step 619, the GGSN 160 transmits the decrypted IP packet to the home network 190. The decrypted packet is transmitted according to the client's mobile EP protocols for transmission to the home network 190.

Figure 6C:
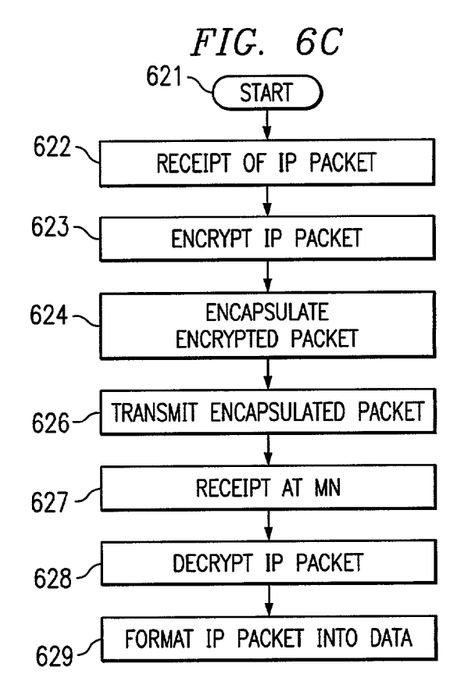
FIG. 6C is a flow diagram showing the sequence of operation for a transmission from the foreign agent to the mobile node.

FIG. 6C shows the operation of the IP/VPN client while transmitting an IP packet from the GGSN 160 to the MN 180. The program starts at step 621, which includes assigning a PDP context to the MN 180, exchanging session keys, negotiating encryption algorithms, and establishing a mobile IP connection to the home network 190. Step 622 is receipt of an IP packet by the GGSN 160 from the Home Network 190 with the assigned care-of IP address for the MN 180. At step 622, according to the applicable subroutines in the client, the GGSN 160 consults its routing table to determine the actual location of the MN 180 on the GPRS 100 network. An indicator on a routing table associated with MN 180 indicates a requirement for encrypting the packet, and this indicator causes the client to implement the prescribed encryption algorithms dictated by the integrated client software.

Following step 622, the program proceeds to step 623 where the IP packet is encrypted according to the negotiated encryption algorithm and session keys. An IPSec header is generated and appended to the front of the encrypted IP packet for transmission over the GPRS 100 to the MN 180. At step 624, the GGSN 160 client encapsulates the encrypted packet with an address header for routing the information packet to the MN 180's location on GPRS 100. This routing address header will route packets to the BTS 120 for transmission to MN 180, and the address header is copied from a routing table entry associated with the IP address for the MN 180 in the IP header data field for the destination.

At step 626, the encapsulated, encrypted packet is transmitted by the client operating on GGSN 160 to the BSC 111. The BSC 111 interprets the routing address header and routes the packet to the BTS 120, which transmits the packet over wireless link 181 to the MN 180. At step 627, the MN 180 receives the transmitted packet and processes the packet to reveal the IPSec header. The IPSec tells the client that the packet is encrypted and must be decrypted. At step 628, the packet is decrypted by the integrated software package operating on the MN 180, essentially performing the inverse operation of the agreed upon encryption algorithm and session keys. Once the packet is decrypted, the original IP packet is revealed. At the final step 629, the IP packet is formatted into data compatible for use on an application program on MN 180.

Figure 6D:
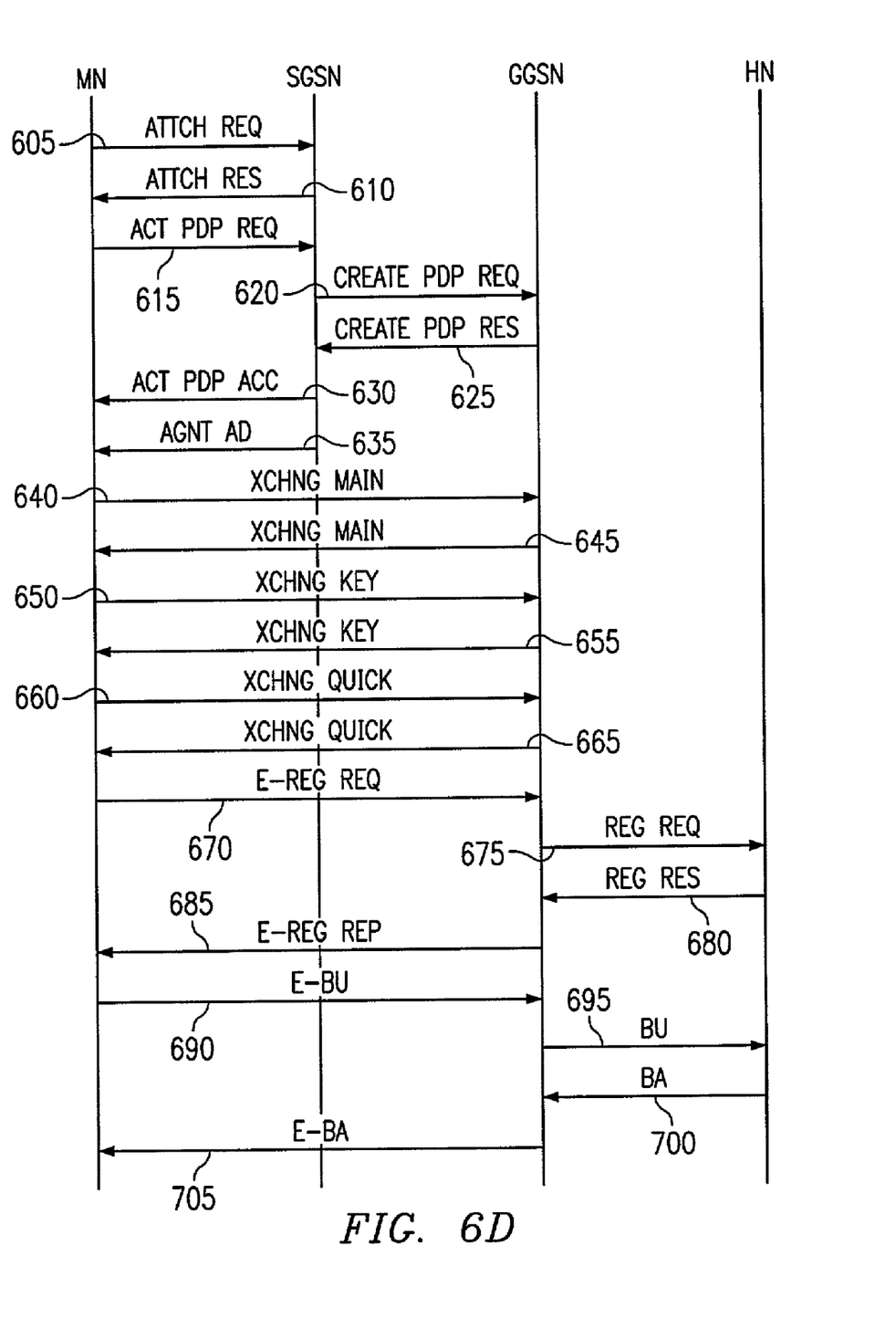
FIG. 6D is the specific message sequence for initiating the secure VPN link in the invention.

FIG. 6D shows the specific message sequence to set up the IP/VPN client. During initialization at step 605, the MN 180 attaches to GPRS 100. After connecting to BSS 111 over wireless link 181, MN 180 sends Attachment Request message (Attch Req) to the SGSN 140. The SGSN 140 processes the request, checking that the user is authorized access, and generates a temporary identity. At step 610, the SGSN 140 sends an Attachment Response (Attch Res) message assigning a temporary identity to the MN 180. To exchange information packets on the GPRS 100, the MN 180 must obtain a Packet Data Protocol (PDP) address to use while on the GPRS 100. During step 615, the MN 180 sends an Activate PDP Context Request (Act PDP Req) message to the SGSN 140, which processes the request. At step 620, the SSGN 140 sends a Create PDP Context Request (Create PDP Req) message to the GGSN 160. The GGSN 160 processes the request and obtains a PDP address for the MN 180 to use on the GPRS 100.

In step 625, a Create PDP Context Response (Create PDP Res) message is generated by the GGSN 160 and sent to the SGSN 140. In step 630, the SGSN 140 generates and transmits an Activate PDP Context Accept (Act PDP Acc) message to MN 180 containing a PDP context. The PDP permits the MN 180 and the GGSN 160 to communicate.

After completing GPRS attachment and context activation, the MN 180 can now initiate the mobile IP security protocols and establish an IPSec tunnel. At step 635, the MN 180 receives an Agent Advertisement (Agnt Ad) message from the GGSN 160 and processes the advertisement to extract a care-of IP address. At this point, the MN 180 exchanges the information to set up the secured tunnel with the GGSN 160.

In step 640, an Internet Security Association and Key Management Protocol (ISAKMP) XCHNG Main Mode message (XCHNG Main) is sent to the GGSN 160 from the MN 180. This message proposes several authentication algorithms and authentication methods. An acceptable encryption algorithm includes Message Digest 5 (MD5), Secure Hash Algorithm (SHA), and a Diffie-Hellman combination algorithm using a public and private encryption key. The GGSN 160 responds at step 645 with an XCHNG Main Mode message (XCHNG Main) with one selected proposed encryption algorithm and authentication process, which is used to secure the exchange of public encryption keys. At step 650, the MN 160 sends an XCHNG Main Mode (XCHNG Key) containing its authenticated, encoded public encryption key. The GGSN 160 then sends an XCHNG Main Mode message (EXCHNG Key) containing its authenticated encoded public encryption key in step 655. This completes the first phase of establishing a secure, authenticated link between the GGSN 160 and the MN 180.

The next phase is to negotiate the security association for the IPSec services between the MN 180 and the GGSN 160. At step 660, the MN 180 generates an ISAKMP XCHNG Quick Mode (XCHNG Quick) message with several encryption algorithm proposals to the GGSN 160. The GGSN 160 responds with a selected algorithm in an ISAKMP XCHNG Quick Mode (XCHNG Quick) message in step 665. Acceptable algorithms include Data Encryption Standard (DES), Triple Data Encryption Standard (3DES), Rivest-Shamir-Aldeman (RSA), ElGamal, RC2 and RC4. New encryption keys may also be exchanged for use. The message exchange at steps 660 and 665 completes set up of the security association for IP security. With the exchange of the keys and setting an encryption algorithm, the MN 180 and the GGSN 160 can now encrypt and transmit encrypted information packets which each can decrypt using the shared keys. The MN 180 can now initiate a secure mobile IP session over the established VPN.

In step 670, the MN 180 encrypts a Registration Request (e-Reg Req) message addressed to the home network and transmits it to the GGSN 160. The information packet being sent to the home network 190 is encapsulated with a routing address header. The PDP context message exchange at steps 615 to 630 assigned a routing address association for the MN 180. The destination address data field in the encapsulated message is the routing address of the GGSN 160, and the source address data field is the assigned PDP association, or routing address, for the MN 180.

After receiving the encrypted information packet at step 670, the GGSN 160 processes the information packet, stripping off the address header and decrypting the information into the original IP information packet. At step 675, the GGSN 160 generates a Registration Request message (Reg Req) and sends the message to the home network 190 where it is processed. If MN 180 is authorized access, the home network 190 generates and transmits a Registration Response message (Reg Res) to the GGSN 160 at step 680.

At step 685, after receiving the Reg Res message from the home network 190, the GGSN 160 processes the message, generating a Registration Response message. The GGSN 160 then encrypts and encapsulates the message and transmits the Encrypted Registration Response message (e-Reg Res) to the MN 180. The MN 180 processes the packet, decrypting the message and processing the decrypted data payload at step 685. During step 690, the MN 180 generates an encrypted Binding Update message (e-BU) encapsulated with the address header for the GGSN 160. The message is transmitted to the GGSN 160. At step 695, the GGSN 160 processes the message, stripping off the address header and decrypting the message to the original Binding Update message (BU), which the GGSN 160 then transmits to the home network 190.

At step 700, the home network 190 processes the information in the BU message, confirming the IP care-of address for MN 180 and completing update of routing tables and registration of the care-of address and MN 180 IP address association. A Binding Acknowledgement message (BA) is generated and then transmitted back to the GGSN 160. At step 705, the GGSN 160 generates an encapsulated Encrypted Binding Acknowledgement message (e-BA) and transmits the e-BA to the MN 180, where it is decrypted and processed.

This completes the protocol establishing a VPN link between the GGSN 160 and the MN 180 and secures the wireless signal 181 from the BSS 120 to the MN 180. If the MN 180 changes connection while moving within the GPRS 100, a PDP context modification is done to update the PDP context for the MN 180. A routing table on the GGSN 160 will be updated, but a new encryption set up and mobile IP initialization will not be required.

Figure 6E:
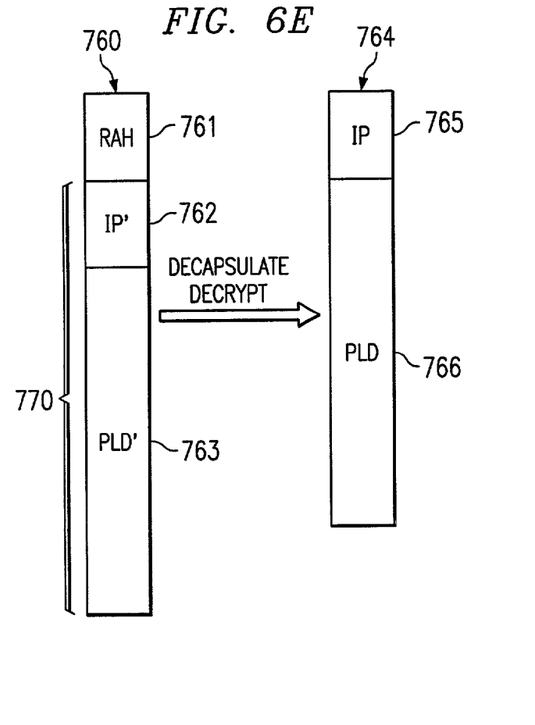
FIG. 6E is a graphical representation of an encrypted, encapsulated packet and decapsulating and decrypting procedure.

Referring to the encapsulated, encrypted information packet 760 in FIG. 6E, during the mobile IP session the information packets exchanged between the MN 180 and the GGSN 160 under the invention will have a routing address header (RAH) 761. The IP' header 762 and the data payload (PLD') 763 are encrypted by the combination IP/VPN client and then encapsulated with the routing address header 761. The encrypted portion of the packet 770 can be transmitted securely over the wireless link 181. After arrival at the MN 180 or the GGSN 160, the outer routing address header (RAH) 761 is stripped off and the encrypted IP' header 762 and data PLD' 763 are decrypted, which will reveal the decapsulated, decrypted information packet 764 with an IP header 765 and PLD 766.

During the mobile IP communication session, the MN 180 and the GGSN 160 exchange information packets that have been encrypted for transmission over the wireless link 181. The messages transmitted over the wireless link 181 are encrypted using the negotiated and agreed upon encryption algorithm and shared public keys and unshared private keys. The encrypted information packets are secured for transmission over the MN 180 to GGSN 160 interface and then decrypted for transmission over the GPRS 100 infrastructure to the home network 190 or processing as transmitted data on the mobile node.

Figure 7A:
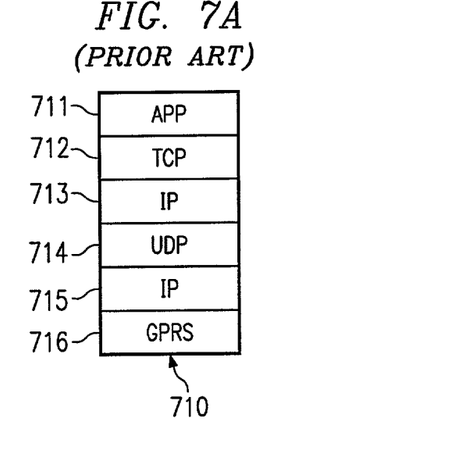
FIG. 7A is a protocol stack diagram for the mobile node under the prior art.

FIG. 7A shows the prior art protocol stack 710 for the MN 180. The first protocol for the prior art protocol stack is the application layer (APP) 711. The second protocol is the TCP layer 712. The third layer is the IP protocol 713. A UDP protocol 714 is the fourth layer. The fifth layer is another IP protocol layer 715, and the final layer is the GPRS layer 716.

Figure 7B:
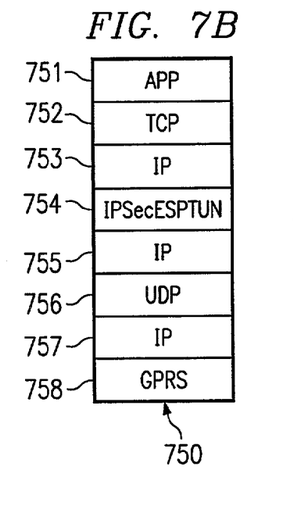
FIG. 7B is a protocol stack diagram for the mobile node under the invention.

FIG. 7B shows the new configuration of the protocol stack 750 for the MN 180 under the invention. The first protocol for the new protocol stack is the application layer (APP) 751. The second protocol is the TCP layer 752. The third layer is an IP protocol 753. The IP Security Encapsulating Security Payload Tunnel (IPSecESPTUN) 754 is the fourth layer. The fifth layer is another IP protocol layer 755. The sixth layer is a UDP layer 756. The seventh layer is another IP layer 757. The eighth and final layer is the GPRS layer 758.

Figure 8A:
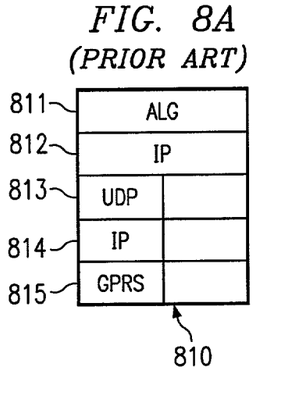
FIG. 8A is a protocol stack diagram for the Gateway GPRS Service Node (GGSN) under the prior art.

FIG. 8A shows the prior art protocol stack 810 for the GGSN 160. The first layer is the Adaptation Layer Gateway (ALG) protocol 811. The second layer is an IP protocol layer 812. On the link with the MN 180, the third layer is a UDP protocol layer 813. For the fourth layer on the link with MN 180, there is an IP protocol 814. On the link with the MN 180, the fifth protocol layer is a GPRS protocol 815.

Figure 8B:
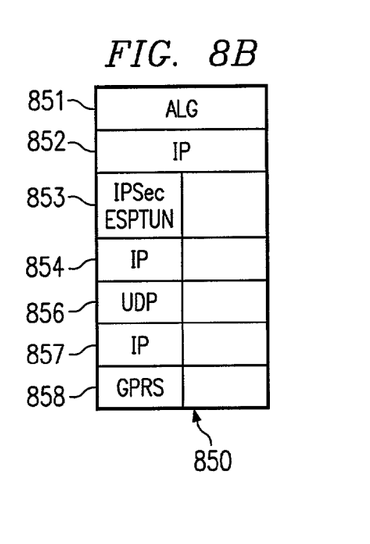
FIG. 8B is a protocol stack diagram for the Gateway GPRS Service Node (GGSN) under the invention.

FIG. 8B shows the protocol stack 850 for the GGSN 160 under the invention. The first layer is the Adaptation Layer Gateway (ALG) 851. The second layer is an IP protocol layer 852. On the link with the MN 180, the third layer is a UDP protocol layer 853. For the fourth layer on the link with MN 180, there is an IPSecESPTUN protocol 854. On the link with the MN 180, the fifth protocol layer is an IP protocol layer 854. On the link with the MN 180, the next protocol layer is a UDP protocol 856. The seventh protocol layer for the link with MN 180 is an IP protocol layer 857, and the eighth and final protocol layer is a GPRS protocol 858.

While the invention has been particularly shown and described with respect to preferred embodiments, it will be readily understood that minor changes in the details of the invention may be made without departing from the spirit of the invention.

Having described the invention, we claim:

1. A secure packet-based wireless communication system, comprising:

a foreign agent on a foreign network wirelessly linked to a mobile node, wherein the foreign agent routes information packets for the mobile node;

an integrated secure transmission protocol performing both communication and security functions in a single software application operating on the foreign agent and the mobile node, said protocol operating on the mobile node and foreign agent, forming an integrated packet-based virtual private network client between the mobile node and the foreign agent to perform communication and security functions and supporting the transmission of encrypted information packets between the mobile node and the foreign agent.

2. The secure packet-based wireless communication system of claim 1 wherein the integrated secure transmission protocol includes a security initialization procedure to negotiate encryption algorithms used to encrypt information packets for transmission for the mobile node.

3. The secure packet-based wireless communication system of claim 1 wherein the integrated secure transmission protocol includes a security initialization procedure to exchange encryption keys used in the encryption algorithms to encrypt information packets for transmission for the mobile node.

4. The secure packet-based wireless communication system of claim 1 wherein the integrated secure transmission protocol further comprises communication support for the transmission of encrypted information packets.

5. The secure packet-based wireless communication system of claim 1 wherein the communication system may comprise a general packet radio service, a universal mobile telecommunication system, or a code division multiple access system.

6. The secure packet-based wireless communication system of claim 1 wherein the packet-based virtual private network is an IP virtual private network.

7. A method of securing information packet transmissions between a mobile node and a foreign network comprising the steps of:

providing the foreign network with a foreign agent supporting information packet transmission over a wireless communication link to the mobile node;

providing a communication link from the foreign network;

establishing an integrated packet-based virtual private network to support communication and security functions, including the support of a secure communication link between the foreign agent and the mobile node;

initiating an integrated security transmission protocol using a single software client on the packet-based virtual private network having both communication and security functions on the foreign agent and the mobile node; and transmitting an encrypted information packet formed under the integrated security transmission protocol to the mobile node.

8. The method of securing information packet transmissions between a mobile node and a foreign network of claim 7 further comprising the step of:

exchanging authenticated and secure information packets between the foreign agent and the mobile node containing encryption algorithm information formed under the integrated security transmission protocol.

9. The method of securing information packet transmissions between a mobile node and a foreign network of claim 7 further comprising the step of:

exchanging authenticated and secure information packets between the foreign agent and mobile node containing encryption keys for use by the integrated security transmission protocol.

10. The method of securing information packet transmissions between a mobile node and a foreign network of claim 9 wherein the encryption algorithms include data encryption standard (DES), triple data encryption standard (3DES), Rivest-Shamir-Aldeman (RSA), ElGamal, RC2, or RC4.

11. The method of securing information packet transmission between a mobile node and a foreign network of claim 9 wherein the method of authenticating and securing the information packets during the key exchange include Message Digest 5 (MD5), Secure Hash Algorithm (SHA), or Diffie-Hellman algorithms.

12. The method of securing information packet transmissions between a mobile node and a foreign network of claim 7 further comprising the steps of:
   receiving an encapsulated encrypted registration request for a communication session from the mobile node at the foreign agent;
   decapsulating the encrypted registration request received from the mobile node;
   decrypting the encrypted registration request received from the mobile node for a communication session by the foreign agent; and
   transmitting the decrypted registration request from the foreign network to a home network.

13. The method of securing information packet transmissions between a mobile node and a foreign network of claim 7 further comprising the steps of:
   receiving an information packet at the foreign agent;
   encrypting the information packet received by the foreign agent;
   encapsulating the encrypted information packet; and,
   transmitting the encrypted information packet from the foreign agent to the mobile node.

14. The method of securing information packet transmissions between a mobile node and a foreign network of claim 7 further comprising the steps of:
   generating an information packet at the mobile node;
   encrypting the information packet generated by the mobile node;
   encapsulating the encrypted information packet; and,
   transmitting the encrypted information packet to the foreign agent for decapsulation and decryption.

15. The method of securing information packet transmissions between a mobile node and a foreign network of claim 7 wherein the integrated security transmission protocol is implemented by adding a transmission protocol layer to the transmission protocol stack for the encapsulation/decapsulation and encryption/decryption functions.

16. A method of securing information packet transmissions of claim 7 wherein the packet-based virtual private network is an IP virtual private network.

17. A method for secure packet-based wireless communication comprising the steps of:
   providing a foreign agent on a foreign network coupled over a wireless link to a mobile node, wherein the foreign agent supports transmission of information packets for the mobile node;
   initializing a secure virtual private network connection between the foreign agent and the mobile node for supporting communication and security functions with an integrated platform, operating an integrated security transmission protocol having both communication and security functions to transmit and receive secure information packet transmissions over the virtual private network connection; and
   transmitting an encrypted information packet formed by the integrated security transmission protocol.

18. The method for secure packet-based wireless communication of claim 17 wherein the encrypted information packet is decrypted using said integrated security transmission protocol.

19. The method for packet-based wireless communication of claim 18 wherein the decrypted information packet is transmitted from the foreign agent.

20. The method for secure packet-based wireless communication of claim 17 wherein said encrypted information packet has an encrypted address used by the foreign agent to route information packets, encrypted data, and an unencrypted encapsulating address header used to route the information packet.

21. The method for secure packet-based wireless communication of claim 17 wherein the initialization step is controlled by software subroutines that establishes the communication link for the mobile node.

22. The method for secure packet-based wireless communication of claim 17 wherein the initialization step includes a subroutine that controls encryption and decryption of said information packets.

* * * * *